United States Patent
Hernandez et al.

(10) Patent No.: US 11,578,411 B2
(45) Date of Patent: Feb. 14, 2023

(54) CORROSION INHIBITOR

(71) Applicant: University of Louisiana at Lafayette, Lafayette, LA (US)

(72) Inventors: Rafael Hernandez, Lafayette, LA (US); Liew Go, Lafayette, LA (US)

(73) Assignee: University of Louisiana at Lafayette, Lafayette, LA (US)

(*) Notice: Subject to any disclaimer, the term of this patent is extended or adjusted under 35 U.S.C. 154(b) by 0 days.

(21) Appl. No.: 16/746,072

(22) Filed: Jan. 17, 2020

(65) Prior Publication Data
US 2020/0232101 A1   Jul. 23, 2020

Related U.S. Application Data

(60) Provisional application No. 62/794,117, filed on Jan. 18, 2019.

(51) Int. Cl.
*C23F 11/173* (2006.01)
*C08L 101/00* (2006.01)
*C23F 11/10* (2006.01)
*C09K 8/54* (2006.01)

(52) U.S. Cl.
CPC .......... *C23F 11/173* (2013.01); *C08L 101/00* (2013.01); *C09K 8/54* (2013.01); *C23F 11/10* (2013.01); *C09K 2208/32* (2013.01)

(58) Field of Classification Search
None
See application file for complete search history.

(56) References Cited

U.S. PATENT DOCUMENTS

2007/0209998 A1* 9/2007 Abu-Orf ............... C02F 11/04
                                                              210/624

FOREIGN PATENT DOCUMENTS

CN         104845456 A  *  8/2015

OTHER PUBLICATIONS

Zhang et al. "Review: Value-Added Products Derived from Waste Activated Sludge: A Biorefinery Perspective" Water, 2018, 10, 545, PDF pp. 1-20; accessible online from www.mdpi.com/journal/water. (Year: 2018).*
English text machine translation of Wang et al. (CN 104845456 A), accessed online from Espacenet, patent published on Jul. 29, 2015; a PDF copy is attached, pp. 1-11. (Year: 2015).*
Su et al. "A new insight into resource recovery of excess sewage sludge: Feasibility of extracting mixed amino acids as an environment-friendly corrosion inhibitor for industrial pickling," Journal of Hazardous Materials vol. 279, 2014, pp. 38-45, ISSN 0304-3894 accessed online from https://www.sciencedirect.com/science/article/pii/S0304389414005329 (Year: 2014).*
Derwent abstract Acc-No. 2018-786394 for Cao et al. (CN 108570115 A), "Recycling polysaccharide in extracellular polymer comprises e.g. collecting active sludge . . . " (Year: 2018).*

(Continued)

*Primary Examiner* — Katie L. Hammer
(74) *Attorney, Agent, or Firm* — Kean Miller LLP; Lauren J. Rucinski; Russel O. Primeaux

(57) ABSTRACT

This invention presents a novel corrosion inhibitor. In the preferred embodiment, the inventive corrosion inhibitor comprises extracellular polymeric substances (EPS). In one embodiment, the invention presents a novel EPS corrosion inhibitor using waste activated sludge (WAS). In this embodiment, WAS is heated to release EPS from the microbial mixture.

4 Claims, 2 Drawing Sheets

| Concentration (ppm) | $E_{corr}$ (V) Average ± Standard deviation | $I_{corr}$ (µA/cm²) Average ± Standard deviation | Inhibition efficiency (%) Average ± Standard deviation |
|---|---|---|---|
| 0 | -0.74 ± 0.01 | 46.49 ± 3.15 | N/A |
| 200 | -0.72 ± 0.00 | 15.6 ± 0.74 | 67.55 ± 2.99 |
| 400 | -0.73 ± 0.01 | 13.86 ± 1.48 | 71.10 ± 5.08 |
| 600 | -0.74 ± 0.01 | 13.56± 1.76 | 71.68 ± 5.62 |
| 800 | -0.75 ± 0.01 | 9.74 ± 2.47 | 78.54 ± 6.69 |
| 1000 | -0.75 ± 0.01 | 10.34 ± 2.39 | 78.56 ± 4.81 |

(56) References Cited

OTHER PUBLICATIONS

Go LC, Holmes W, Depan D, Hernandez R. 2019. "Evaluation of extracellular polymeric substances extracted from waste activated sludge as a renewable corrosion inhibitor." PeerJ 7:e7193 https://doi.org/10.7717/peerj.7193. (Year: 2019).*

* cited by examiner

FIGURE 1

| Concentration (ppm) | $E_{corr}$ (V)<br>Average ± Standard deviation | $I_{corr}$ (µA/cm$^2$)<br>Average ± Standard deviation | Inhibition efficiency (%)<br>Average ± Standard deviation |
|---|---|---|---|
| 0 | -0.74 ± 0.01 | 46.49 ± 3.15 | N/A |
| 200 | -0.72 ± 0.00 | 15.6 ± 0.74 | 67.55 ± 2.99 |
| 400 | -0.73 ± 0.01 | 13.86 ± 1.48 | 71.10 ± 5.08 |
| 600 | -0.74 ± 0.01 | 13.56 ± 1.76 | 71.68 ± 5.62 |
| 800 | -0.75 ± 0.01 | 9.74 ± 2.47 | 78.54 ± 6.69 |
| 1000 | -0.75 ± 0.01 | 10.34 ± 2.39 | 78.56 ± 4.81 |

CORROSION INHIBITOR

CROSS REFERENCE TO RELATED APPLICATIONS

This application claims priority to U.S. provisional application No. 62/794,117 entitled "Novel Corrosion Inhibitor" and filed on Jan. 18, 2019.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BRIEF SUMMARY OF THE INVENTION

This invention presents a novel corrosion inhibitor comprising a mixture of natural polymers of high molecular weight. The invention provides a more cost effective means of preventing corrosion while outperforming various currently available commercial corrosion inhibitors. This is due in part to the lower concentrations needed for the novel corrosion inhibitor when compared to the current art. Furthermore, the invention can be prepared using renewable resources. The invention can be used in many applications including, but not limited to, petroleum exploration, refining operations, and wastewater sludge disposal.

DESCRIPTION OF THE DRAWINGS

The drawings constitute a part of this specification and include exemplary embodiments of the Novel Corrosion Inhibitors, which may be embodied in various forms. It is to be understood that in some instances, various aspects of the invention may be shown exaggerated or enlarged to facilitate an understanding of the invention. Therefore the drawings may not be to scale.

FIG. 1 is a table depicting the potentiodynamic polazarization data for carbon steel in 3.64% NaCl saturated with CO2 in the absence and presence of some concentration of test inhibitor at 25 degrees Celsius.

BACKGROUND

Figure 2:
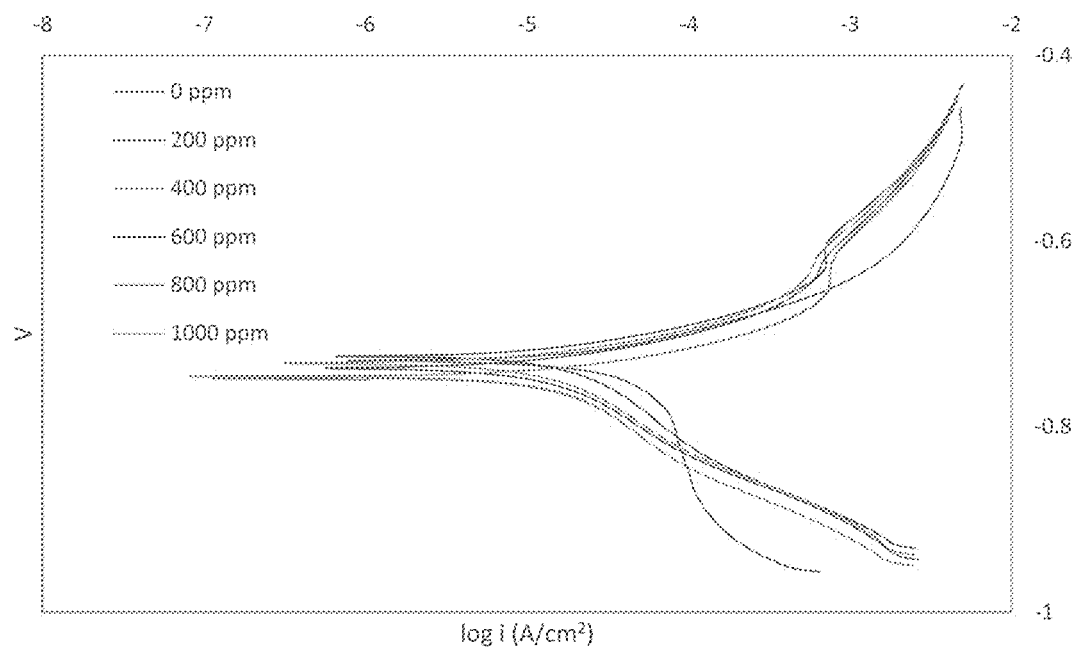
FIG. 2 depicts the potentidynamic polarization curves for carbon steel in 3.64% NaCl saturated with $CO_2$ in the absence and presence of some concentration of test inhibitor at 25° C.

Corrosion is a wide-spread problem in various regions and numerous industries. Many metals and metal alloys are susceptible to corrosion. For example, in the oil and gas industry, pipes, connectors, tanks, boilers, and other important equipment are often exposed to corrosive substances. Corrosion compromises safety and can costs billions of dollars in repairs and equipment replacements. Corrosion can also contribute to environmental problems and contamination. Accordingly, corrosion prevention is a critical part of many industries, including the oil and gas industry.

A corrosion inhibitor is a chemical compound that, when added to certain liquids or gas mixtures, decreases the corrosion rate of a material, typically a metal or metal alloy. Corrosion inhibitors allow less expensive metals to be used in corrosive environments. There are various types of corrosion inhibitors including: anodic inhibitors, cathodic inhibitors, mixed inhibitors, and volatile corrosion inhibitors.

Described herein is a novel corrosion inhibitor. In the preferred embodiment, a mixture of natural polymers of high molecular weight are used as the anticorrosive product. Sodium chloride saturated with carbon dioxide are added to the test solution to simulate a corrosive environment encountered during, for instance, oil field applications. The invention presents a novel anticorrosive product tested and proved using potentiodynamic polarization.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

This invention presents a novel corrosion inhibitor. In the preferred embodiment, the inventive corrosion inhibitor comprises extracellular polymeric substances ("EPS").

In one embodiment, the invention presents a novel EPS corrosion inhibitor using waste activated sludge ("WAS"). In this embodiment, WAS is heated to release EPS from the microbial mixture. The heating method may suitably comprise any heating method known in the art that will suitably heat WAS to the appropriate temperature to release the EPS. In one embodiment, a suitable amount of Was is collected, for example 500 mL. The WAS is then separated into a plurality of vessels, depending on the size of the hearing element. For instance, the WAS may be separated into two 250 mL beakers and heated with a Fisher Scientific™ Isotemp™ Digital Stirring Hotplates at 80° C. Other heating elements and temperatures may also be used, depending on the amount of WAS to be heat treated. Then, the heat treated WAS is agitated by, for example, stirring. In one instance, the WAS is stirred at 600 rpm until 20% of the original volume is left. However, depending on the amount of WAS and the scale of the product to be produced, any suitable heating element and agitation method may be used.

The resulting solutions are then combined, cooled, and centrifuged at 3000 rpm for 5 minutes, or any suitable rate and time period. Then, the liquid fraction is collected and 100 mL of chilled ethanol (−20° C.) is added into the solution. The precipitate, EPS, is filtered from the solution, and dried to form the novel corrosion inhibitor.

Example 1

In this example, the novel corrosion inhibitor was tested using 3.64% NaCl saturated with $CO_2$ with the potentiodynamic polarization technique to simulate numerous situations in oil and gas exploration.

For instance in one embodiment, once EPS is added to the test solution, potentiodynamic polarization is then performed. In one embodiment, the potentiodynamic polarization is performed using a Gamry Flexcell Critical Pitting Cell Kit, connected to the Camry Potentiostat Interface 1000. However, other suitable equipment may be used.

In this example, the reference, counter, working electrodes used were saturated calomel electrode (SCE), graphite rod, and the metal specimen, respectively. The setup was equipped with a heating jacket connected to TDC4 Omega temperature controller to maintain the test solution at 25° C. The Glas-Col GT Series stirrer was connected to the setup externally and adjusted to 50 rpm to obtain the desired shear and to ensure even heating. The working solution volume was 1000 mL. The working area of the metal specimens had a circular form of 5 cm².

The potentiodynamic polarization scans were carried out in the potential range of −0.25 to +0.25 V versus corrosion potential ($E_{corr}$) at a scan rate of 3 V/hr. Corrosive medium (3.64% of NaCl) was added to the reactor with $CO_2$ sparging constantly at 20 psi throughout the example. The reactor was allowed to equalize for 30 minutes prior to the beginning of the example. After the system was equalized, Tafel plots were graphed with Gamry DC105 DC Corrosion Technique Software until three relatively similar readings were obtained. Then, the test corrosion inhibitor (supernatant of heated WAS after centrifugation, or commercial mixture) was added into the reactor. The reactor was again allowed to equalize for 30 minutes and Tafel plots were graphed. This step was repeated until three consecutive graphs with similar trends were obtained to ensure the stability of the system. Corrosion inhibitors were tested at different concentrations.

The curves generated from the potentiodynamic polarization measurements for carbon steel in 3.64% NaCl saturated with $CO_2$ in the absence and presence of test inhibitor at 25° C. are presented in FIG. 2. The details of electrochemical parameters obtained from the curves, such as corrosion potential ($E_{corr}$), corrosion current density ($I_{corr}$), and percentage of protection are listed in FIG. 1.

The curves revealed well defined anodic and cathodic polarization Tafel regions. The anodic and cathodic branch of polarization curves shifting to lower values of current density as compared to the blank (0 ppm). This phenomenon indicates the inhibition of both the hydrogen evolution and metal dissolution reactions. This may be ascribed to adsorption of inhibitor over the metal surface. There was no definite trend observed in $E_{corr}$ values in the presence of different concentrations of EPS.

This result indicates that the EPS may be regarded as mixed type corrosion inhibitor in presence of $CO_2$ saturated 3.64% NaCl solutions. The maximum displacement in $E_{corr}$ of less than 0.085 V is also suggesting mixed mode of inhibition. When 200 ppm of inhibitor was applied, the average percentage of protection was approximately 68% with 3% of standard deviation. This value increased with the inhibitor concentration. Maximum inhibition protection occurred at 1000 ppm, with an efficiency of approximately 79.0%±4.8%. FTIR revealed the major functional groups of the extracted EPS from WAS are O-H, N—H, C—N, C=O, and C—H. These chemical groups play a major role in forming biofilms on metal surfaces, and contributing to overall corrosion protection. Mixture of compounds representatives of these chemical groups were evaluated for corrosion inhibitors. Optimization of these mixtures has resulted in higher corrosion inhibition at lower concentrations.

For the purpose of understanding the Novel Corrosion Inhibitors references are made in the text to exemplary embodiments of a Novel Corrosion Inhibitors, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

The invention claimed is:

1. A corrosion inhibitor comprising extracellular polymeric substances derived from waste activated sludge; wherein said extracellular polymeric substances consist of the functional groups O—H, N—H, C—N, C=O, and C—H.

2. The corrosion inhibitor of claim 1 wherein said waste activated sludge is heated in order to release said extracellular polymeric substances.

3. The corrosion inhibitor of claim 1 wherein said extracellular polymeric substance is applied in the presence of a CO2 saturated NaCl solution.

4. A corrosion inhibitor comprising extracellular polymeric substances derived from waste activated sludge and a solution, wherein said extracellular polymeric substance is 1,000 parts per million of said corrosion inhibitor.

* * * * *